No. 842,482.　　　　　　　　　　　　　　PATENTED JAN. 29, 1907.
G. MATSON.
HAY SLING LOCK.
APPLICATION FILED JUNE 27, 1906.

2 SHEETS—SHEET 1.

Witnesses
G. R. Thomas
F. B. MacNab

Inventor
G. Matson
By Chandler & Chandler
Attorneys

No. 842,482. PATENTED JAN. 29, 1907.
G. MATSON.
HAY SLING LOCK.
APPLICATION FILED JUNE 27, 1906.
2 SHEETS—SHEET 2.
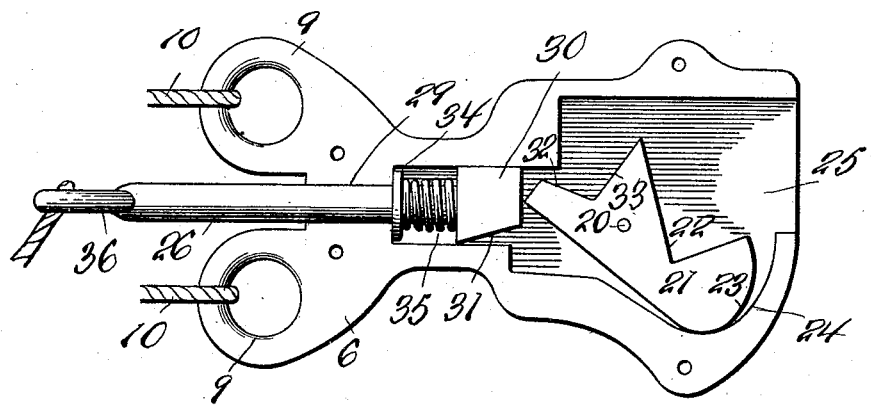
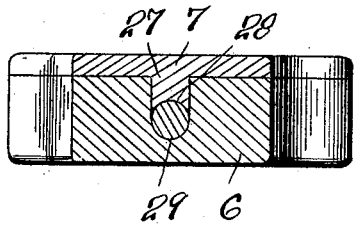
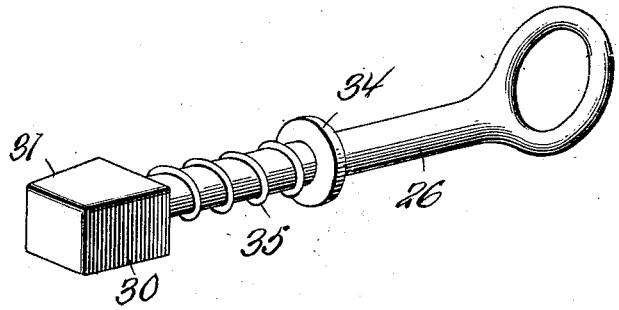
Witnesses
G. R. Thomas
F. B. MacHal.
Inventor
G. Matson
By Chandler & Chandler
Attorneys

UNITED STATES PATENT OFFICE.

GUSTAVE MATSON, OF CROOKSTON, MINNESOTA.

HAY-SLING LOCK.

No. 842,482.  Specification of Letters Patent.  Patented Jan. 29, 1907.

Application filed June 27, 1906. Serial No. 323,646.

*To all whom it may concern:*

Be it known that I, GUSTAVE MATSON, a citizen of the United States, residing at Crookston, in the county of Polk, State of Minnesota, have invented certain new and useful Improvements in Hay-Sling Locks; and I do hereby declare the following to be a full, clear, and exact description of the invention, such as will enable others skilled in the art to which it appertains to make and use the same.

This invention relates to hay-sling locks, and has for its object to provide a simple device of this character which although it may be easily tripped when desired to release the load from the sling but which will not be liable to accidental tripping, as in the case of similar devices now on the market.

A further object of the invention resides in the provision of a latch mechanism of such construction that it will be readily detached from the casing in which it is seated when it is desired to supply new parts or repair the old parts.

With the above and other objects in view the present invention consists in the construction and arrangement of parts shown in the accompanying drawings, in which—

Figure 1:
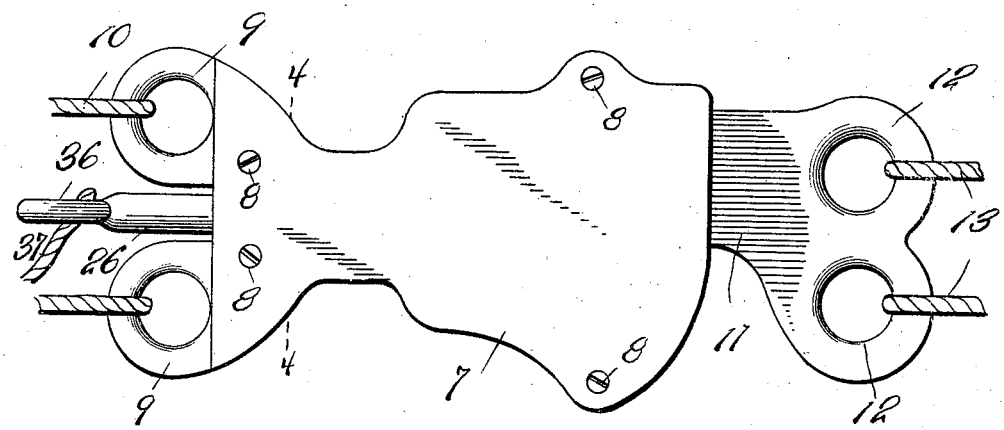
Figure 2:
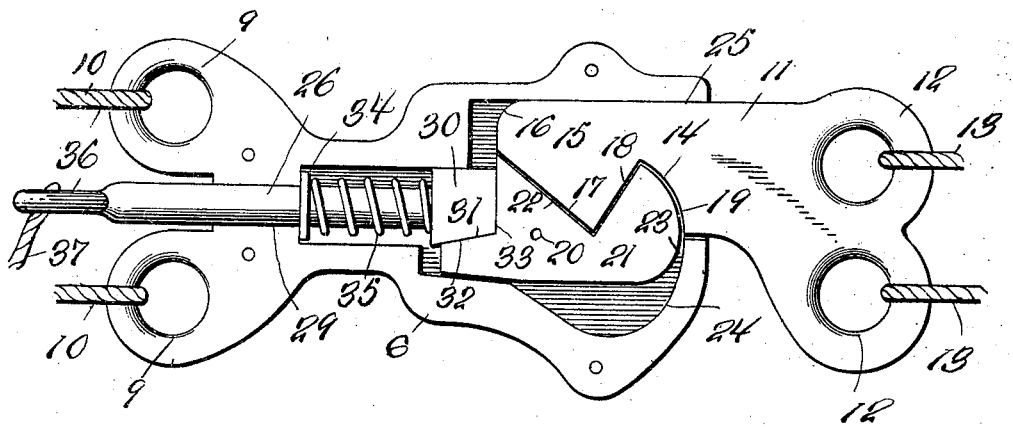

Figure 1 is a plan view of the lock. Fig. 2 is a similar view with the cover for the casing removed. Fig. 3 is a view similar to Fig. 2, showing the position of the dog element of the lock for the insertion of the trip-head. Fig. 4 is a detail transverse sectional view on the line 4 4 of Fig. 1, and Fig. 5 is a detail view of the detent-bolt for the dog element of the lock.

Referring more specifically to the drawings, the numeral 6 denotes a casing, and 7 a cover therefor, the cover being secured to the casing by means of bolts or rivets 8, which serves to inclose the movable elements of the lock. At one of its ends the casing is provided with a pair of eyes 9 for the passage therethrough of one of the sling-ropes 10, and the device includes a trip-head 11, which is also provided with a pair of eyes 12 for the attachment of the other sling-rope 13 of the sling thereto. The said trip-head comprises a block which is recessed, as at 14, adjacent its end opposite the end at which the eyes 12 are located to form a tooth 15 at the said end. The extreme end of the trip-head at which the tooth 15 is formed is rounded, as at 16, for a purpose to be hereinafter described, and one side 17 of the tooth is beveled and extends to the said rounded end of the block, while the other side 18 of the tooth forms one wall of the recess 14, the other wall being concaved, as at 19.

Pivotally mounted by means of a pin 20 is a dog 21, which is recessed, as at 22, in one of its faces for the reception of the tooth 15 of the trip-head. One end of the dog is rounded, and one wall of the casing is recessed, as at 24, to receive the rounded end of the dog therein when the dog is rocked. The end of the casing adjacent which the dog is located is provided to one side of the recess 24 with an opening 25, through which the toothed end of the trip-head 11 may be inserted for the purpose of engagement with the said dog. As shown in the drawings, a portion of the rounded end 23 of the dog abuts the concaved wall 19 of the recess 14. In order that the dog may be held in this position to prevent accidental disengagement of the trip-head from the trip-lock, a bolt 26 is provided and is slidably mounted in the casing and extends through one end thereof and beyond the eyes 9.

In order that the bolt may be properly centered within the lock and yet be readily removable, I provide upon the under side of the cover 7, at the end thereof corresponding to the end of the casing at which the eyes 9 are formed, a block 27, which has its under face concaved, as at 28, to conform to the contour of the bolt-shank, the said bolt being by this means slidably held in a recess 29, formed in the corresponding end of the casing 6 intermediate the eyes 9. At its inner end the bolt 26 is provided with a head 30, which has one of its side faces beveled, as at 31, to abut a correspondingly-beveled wall 32 of a recess 33, which is formed in the adjacent end of the dog 21. When engaged in this recess, the bolt-head 30 serves to prevent rocking of the dog; but it will be readily understood that as the bolt is retracted in a manner to be hereinafter stated the dog will be permitted to swing into its recess 24 to allow withdrawal of the trip-head 11. In order to normally hold the bolt in this position, a collar 34 is loosely mounted upon the bolt and abuts the inner face of the end wall of the casing in which the recess 29 is formed, and upon the said bolt and between the said collar 34 and the head 30 is disposed a helical spring 35. At its outer end the bolt is provided with an eye 36, with which is connected one end of a trip-rope 37, by means of which the bolt may be retracted for the purpose above stated.

From the foregoing it will be seen that when the cover 7 is removed from the casing all of the movable parts of the lock may be removed, including the bolt 26.

It is to be understood that I do not desire to be limited to the exact details of construction shown and described, for obvious modifications will occur to a person skilled in the art.

What is claimed is—

1. A device of the class described comprising a casing, a cover for the casing, a dog pivotally mounted in the casing, a trip-head designed for engagement through one wall of the casing and with the said dog, a bolt arranged to hold the dog in engagement with said trip-head, and means carried by the cover for holding the bolt in position in the casing.

2. A device of the class described comprising a casing, a dog pivotally mounted in the casing, a bolt slidably engaged through one end of the casing, a collar loosely engaged upon the bolt and designed to abut the said end of the casing, a head carried at one end of the bolt and designed for engagement with the said dog, a spring disposed upon the bolt between the collar and the head, and a trip-head designed for engagement through one end of said casing and with said dog.

In testimony whereof I affix my signature in presence of two witnesses.

GUSTAVE MATSON.

Witnesses:
V. L. McGregor,
Geo. G. Le Blanc.